US010289719B2

(12) United States Patent
Tanaka et al.

(10) Patent No.: US 10,289,719 B2
(45) Date of Patent: May 14, 2019

(54) DATA ACQUISITION DEVICE, DATA ACQUISITION METHOD AND COMPUTER READABLE MEDIUM

(71) Applicant: Mitsubishi Electric Corporation, Tokyo (JP)

(72) Inventors: Satoru Tanaka, Tokyo (JP); Mitsunori Kori, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 15/575,212

(22) PCT Filed: Jul. 10, 2015

(86) PCT No.: PCT/JP2015/069847
§ 371 (c)(1),
(2) Date: Nov. 17, 2017

(87) PCT Pub. No.: WO2017/009886
PCT Pub. Date: Jan. 19, 2017

(65) Prior Publication Data
US 2018/0150510 A1 May 31, 2018

(51) Int. Cl.
*G06F 17/30* (2006.01)
(52) U.S. Cl.
CPC .. *G06F 17/30448* (2013.01); *G06F 17/30339* (2013.01); *G06F 17/30418* (2013.01); *G06F 17/30595* (2013.01)
(58) Field of Classification Search
CPC ......... G06F 17/30463; G06F 17/30864; G06F 17/30867
(Continued)

(56) References Cited

U.S. PATENT DOCUMENTS 7,003,504 B1    2/2006  Angus et al.
7,197,472 B2 *  3/2007  Conkwright ........... G06Q 30/02
                                                  705/1.1
(Continued)

FOREIGN PATENT DOCUMENTS

JP    6-087226 B2    11/1994
JP    9-054714 A     2/1997
(Continued)

OTHER PUBLICATIONS

Andrew Watt: "Creating Views What is a View? Understanding the Need for Views"; In: Microsoft SQL Server 2005 Programming for Dummies, Jul. 30, 2007, John Wiley & Sons ProQuest Ebook Central, XP055521437, ISBN: 978-0-471-77422-8: pp. 181-193.
(Continued)

*Primary Examiner* — Jeff A Burke
*Assistant Examiner* — Thong H Vu
(74) *Attorney, Agent, or Firm* — Birch, Stewart, Kolasch & Birch, LLP

(57) ABSTRACT

The present invention is provided with a command acceptance unit (110) to accept a query command (201) to acquire data from a database, the query command including a value designation range to designate a range of a definition value corresponding to the data to be acquired, an acquisition definition storage unit (160) to store acquisition definition information (161) wherein a value definition range is associated with an acquisition method to acquire data from the database, and a command generation unit (120) to judge whether a range that overlaps with the value definition range exists in the value designation range, and when it is judged that the overlapping range exists, to generate a data acquisition command (202) to acquire data corresponding to a definition value included in the overlapping range in an
(Continued)

acquisition method corresponding to the value definition range.

11 Claims, 16 Drawing Sheets

(58) Field of Classification Search
USPC .................................. 707/713, 804; 716/107
See application file for complete search history.

(56) References Cited

U.S. PATENT DOCUMENTS

| | | | |
|---|---|---|---|
| 7,516,128 B2 | 4/2009 | Colby et al. | |
| 9,137,511 B1* | 9/2015 | LeGrand, III | ........ G06T 19/006 |
| 2001/0051946 A1 | 12/2001 | Nishikawa | |
| 2001/0051951 A1 | 12/2001 | Nishikawa | |
| 2002/0065814 A1* | 5/2002 | Okamoto | .......... G06F 17/30864 |
| 2002/0095405 A1 | 7/2002 | Fujiwara | |
| 2005/0262433 A1 | 11/2005 | Suzuki et al. | |
| 2006/0004746 A1 | 1/2006 | Angus et al. | |
| 2006/0026162 A1* | 2/2006 | Salmonsen | ....... G06F 17/30035 |
| 2006/0212350 A1* | 9/2006 | Ellis | .................. G06Q 30/0242 705/14.41 |
| 2007/0156746 A1 | 7/2007 | Fukuda et al. | |
| 2009/0019003 A1* | 1/2009 | Bohannon | .............. G06Q 30/02 |
| 2009/0150413 A1 | 6/2009 | Basu et al. | |
| 2010/0223296 A1 | 9/2010 | Angus et al. | |
| 2013/0173594 A1* | 7/2013 | Xu | .................... G06F 17/30584 707/722 |
| 2014/0095324 A1* | 4/2014 | Cabral | ................... G06Q 30/08 705/14.71 |
| 2015/0106407 A1* | 4/2015 | Adayilamuriyil | ............................ G06F 17/30595 707/804 |
| 2015/0324507 A1* | 11/2015 | Takami | ............... G06F 17/5081 716/107 |

FOREIGN PATENT DOCUMENTS

| | | |
|---|---|---|
| JP | 9-231116 A | 9/1997 |
| JP | 11-031097 A | 2/1999 |
| JP | 2000-268052 A | 9/2000 |
| JP | 2001-187477 A | 7/2001 |
| JP | 2002-524800 A | 8/2002 |
| JP | 2004-220393 A | 8/2004 |
| JP | 2005-321849 A | 11/2005 |
| JP | 2010-123017 A | 6/2010 |
| JP | 2011-013910 A | 1/2011 |
| JP | 5033322 B2 | 9/2012 |

OTHER PUBLICATIONS

Extended European Search Report dated Nov. 26, 2018 in coresponding European Patent Application No. 15898202.5.

* cited by examiner

Fig. 4

300 : EXAMPLE OF DATAIBASE

301 : POWER TABLE

| DATE AND TIME | BUILDING | 1F | 2F |
|---|---|---|---|
| 2014/3/30 | 10 | 6 | --- |
| 2014/3/31 | 11 | 8 | --- |
| 2014/4/1 | 8 | 6 | 2 |
| 2014/4/2 | 10 | 7 | 3 |
| 2014/4/3 | 10 | 7 | 3 |

3002 : DEFINITION VALUE 3001, 3001a : VALUE DEFINITION RANGE 3001, 3001b : VALUE DEFINITION RANGE

Fig. 5

151: EXAMPLE OF DEFINITION AXIS DEFINITION INFORMATION

| TABLE NAME | COLUMN NAME | DEFINITION VALUE COLUMN |
|---|---|---|
| POWER | POWER OF 2F | DATE AND TIME |

Fig.6

161 : EXAMPLE OF ACQUISITION DEFINITION INFORMATION

| TABLE NAME | COLUMN NAME | START | END | ACQUISITION METHOD |
|---|---|---|---|---|
| POWER | POWER OF 2F | 2013/04/01 | 2014/04/01 | BUILDING-1F |
| POWER | POWER OF 2F | 2014/04/01 | 2015/04/03 | 2F |

Fig. 7

| TABLE NAME | COLUMN NAME | DEFAULT VALUE |
|---|---|---|
| POWER | POWER OF 2F | 0 |

171 : EXAMPLE OF UNDEFINED INFORMATION

DATA ACQUISITION DEVICE, DATA ACQUISITION METHOD AND COMPUTER READABLE MEDIUM

TECHNICAL FIELD

The present invention relates to a data acquisition device, a data acquisition method and a data acquisition program.

BACKGROUND ART

With regard to data stored in a database, there is a case where it is necessary to change acquisition methods of data for each definition section of the data. In a case of acquiring data from a database storing data of various sensor devices, when the sensor devices have been updated and so on, there is a necessity to acquire data after correcting the data depending on the time when the data has been created.

Patent Literature 1 discloses a technique to change a data acquisition definition by rewriting a data acquisition command to be issued to a database by an application using data, before transmitting the data acquisition command to the database, by use of a database language reissue device.

Further, Patent Literature 2 discloses a technique to maintain consistency when data is referred to from outside, in a case where it is necessary to change a definition of the data, by updating the definition of the data beforehand.

CITATION LIST

Patent Literature

Patent Literature 1: JPH09-231116 A
Patent Literature 2: JP2004-220393 A

SUMMARY OF INVENTION

Technical Problem

By the method described in Patent Literature 1, data that can be acquired at a time is limited to one definition section. Thus, in a case of acquiring data that spans a plurality of sections, it is necessary to transmit to a database data acquisition commands as many as the definition sections of the data. Therefore, there is a problem that the processing performance degrades.

Further, in the method described in Patent Literature 2, since it is necessary to create data beforehand for reference, there is a problem that it is difficult to change the data acquisition definition flexibly.

The present invention is aimed at, in acquisition of data spanning a plurality of definition sections, acquiring data by a query command at one time by rewriting a query command, and suppressing degradation of the performance while maintaining flexibility against definition change.

Solution to Problem

A data acquisition device according to one aspect of the present invention including:
a command acceptance unit to accept a query command to acquire data from a database that stores data which is associated with a definition value, the query command including a value designation range that designates a range of a definition value corresponding to the data to be acquired;
an acquisition definition storage unit to store acquisition definition information wherein a value definition range that defines a range of a definition value is associated with an acquisition method to acquire data from the database; and
a command generation unit to judge, by using the query command and the acquisition definition information, whether an overlapping range that overlaps with the value definition range exists in the value designation range, and when the overlapping range is judged to exist, generate a data acquisition command to acquire data corresponding to a definition value which is included in the overlapping range, in an acquisition method corresponding to the value definition range.

Advantageous Effects of Invention

Since a data acquisition device according to the present invention includes an acquisition definition storage unit to store acquisition definition information wherein a value definition range defining a range of a definition value of data and an acquisition method for acquiring data from a database are related, and a command generation unit to generate a data acquisition command for acquiring data corresponding to a definition value included in a range where a value designation range and the value definition range overlap in an acquisition method corresponding to the value definition range, by using a query command and acquisition definition information, there is an effect that it is possible to acquire data by one data acquisition command, and to suppress degradation of the performance while maintaining flexibility against definition change, in acquisition of data spanning a plurality of value definition ranges.

BRIEF DESCRIPTION OF DRAWINGS

FIG. 4 is a diagram illustrating an example of a database according to the first embodiment;

FIG. 5 is a diagram illustrating an example of definition axis definition information according to the first embodiment;

FIG. 6 is a diagram illustrating an example of acquisition definition information according to the first embodiment;

FIG. 7 is a diagram illustrating an example of undefined information according to the first embodiment;

DESCRIPTION OF EMBODIMENTS

First Embodiment

*Explanation of Configuration*

Figure 1:
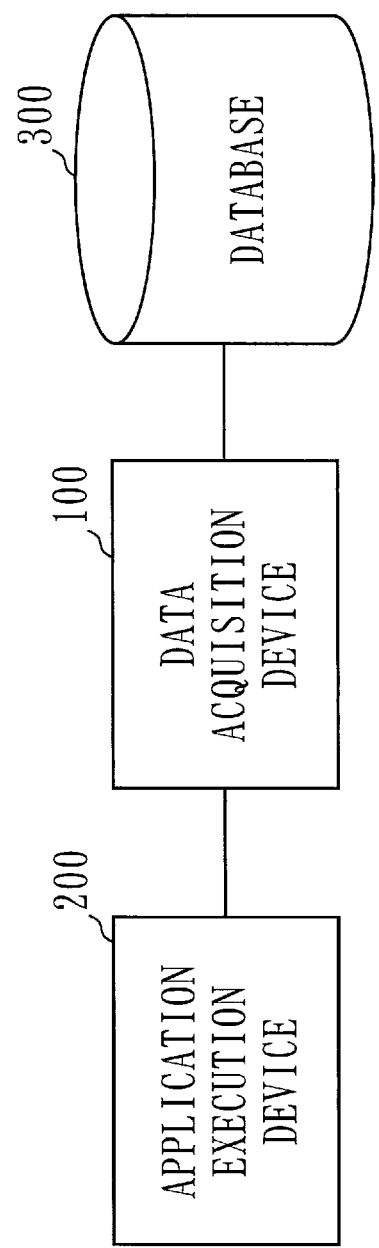
FIG. 1 is a diagram of a system configuration illustrating a use method of a data acquisition device according to a first embodiment.

FIG. 1 is a diagram of a system configuration illustrating a use method of a data acquisition device 100 according to the present embodiment.

The data acquisition device 100 according to the present embodiment is connected to an application execution device 200 and a database 300. The data acquisition device 100 is placed between the application execution device 200 and the database 300.

The application execution device 200 acquires data from the database 300 by using the data acquisition device 100. The application execution device 200 executes an application program to perform processing by using the data acquired from the database 300.

The database 300 stores the data used by the application execution device 200. The database 300 stores data that is associated with a definition value used for definition of data. The definition value used for definition of data is a variable such as a date and time that is associated with data, etc.

The data acquisition device 100 acquires data from the database 300 in response to a query command from the application execution device 200.

Figure 2:
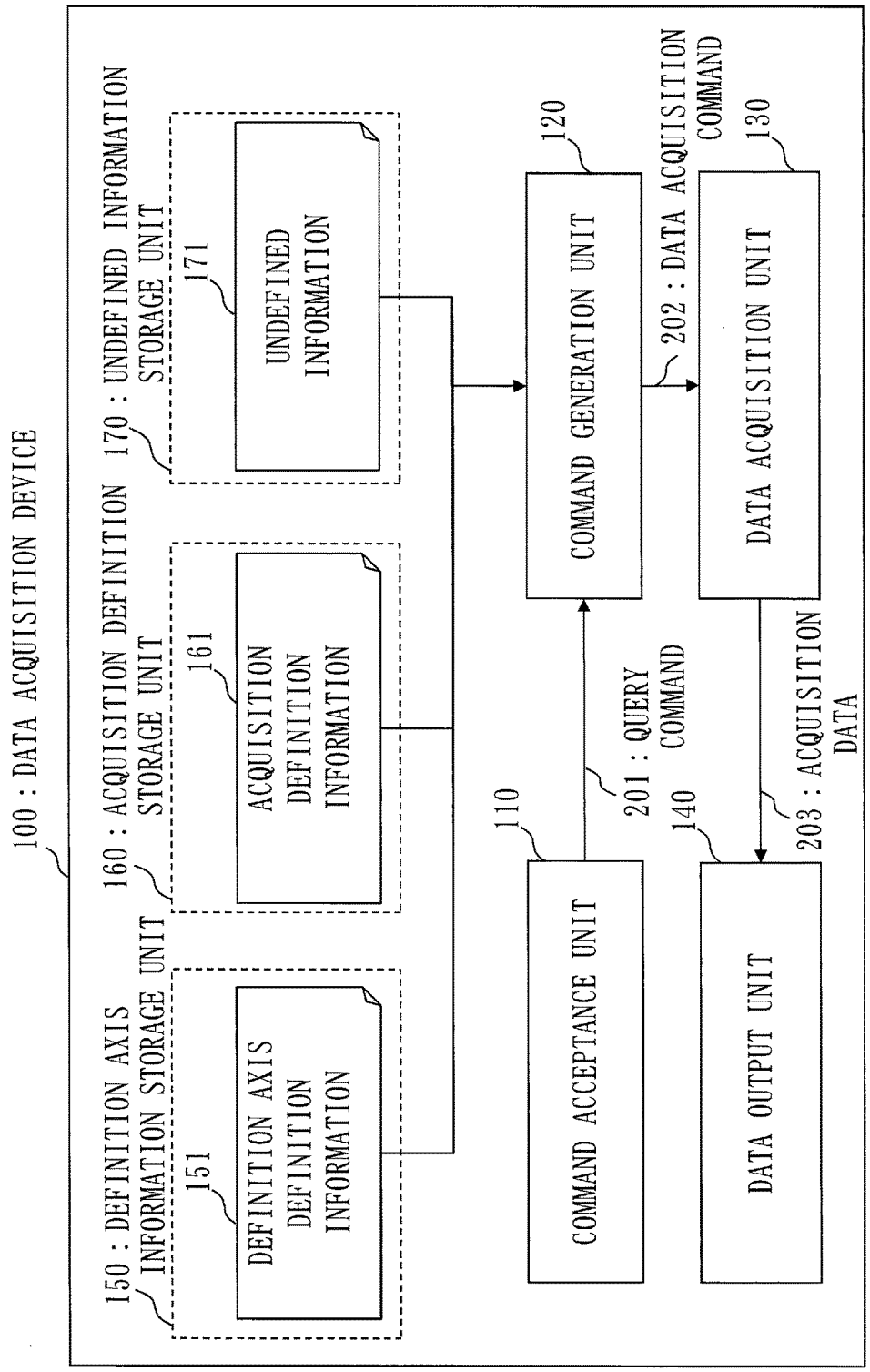
FIG. 2 is a diagram of a block configuration of the data acquisition device according to the first embodiment.

FIG. 2 is a diagram illustrating a block configuration of the data acquisition device 100 according to the present embodiment.

The data acquisition device 100 includes a command acceptance unit 110, a command generation unit 120, a data acquisition unit 130 and a data output unit 140. Further, the data acquisition device 100 includes a definition axis information storage unit 150, an acquisition definition storage unit 160 and an undefined information storage unit 170. The definition axis information storage unit 150 stores definition axis definition information 151. The acquisition definition storage unit 160 stores acquisition definition information 161. The undefined information storage unit 170 stores undefined information 171.

The command acceptance unit 110 accepts a query command 201 output from the application execution device 200 and outputs the query command 201 to the command generation unit 120. The query command 201 is a command to acquire data that is associated with a definition value included in a value designation range to designate a range of the definition value, from the database 300. The query command 201 includes a value designation range. In the present embodiment, the query command 201 includes a value designation range to designate a range of dates and times. The command acceptance unit 110 acquires a query command 201 to acquire data that is associated with dates and times included in the value designation range, from the database 300. The definition value needs not be a date and time, and it will suffice as long as the definition value is a variable associated with data, and a value to be used for definition of data.

The definition axis definition information 151 stores a variable name that indicates a definition value to determine the value definition range of data. The value definition range of data is a range of the definition value corresponding to the data, and may be referred to as a definition section of data. In the present embodiment, in the definition axis definition information 151, a date and time is set as the definition value to determine the value definition range of the data.

The acquisition definition storage unit 160 stores acquisition definition information 161 wherein a value definition range defining a range of a definition value is associated with an acquisition method to acquire data from the database 300. The acquisition definition information 161 includes a plurality of value definition ranges, wherein each acquisition method to acquire data from the database 300 is associated with each value definition range of the plurality of value definition ranges.

The undefined information storage unit 170 stores, when a range that does not overlap with any value definition range of the plurality of value definition ranges exists in the value designation range, undefined information 171 including a default value that is acquired as data corresponding to a definition value included in the range that does not overlap.

The command generation unit 120 determines whether a range that overlaps with a value definition range exists in the value designation range, by using the query command 201 and the acquisition definition information 161. When it is determined that the range that overlaps exists, the command generation unit 120 generates a data acquisition command 202 for acquiring data corresponding to a definition value included in the overlapping range in an acquisition method that corresponds to the value definition range. The command generation unit 120 may be referred to as a command conversion unit that generates a data acquisition command by rewriting the query command 201. The command generation unit 120 converts the query command 201 into a data acquisition command 202 for acquiring data in an acquisition method in accordance with a definition range of data, i.e., the value definition range.

The data acquisition unit 130 acquires data from the database 300 as acquisition data 203 by using the data acquisition command 202 created by the command generation unit 120.

The data output unit 140 outputs the acquisition data 203 acquired by the data acquisition unit 130 to the application execution device 200.

*Explanation of Operation*

Figure 3:
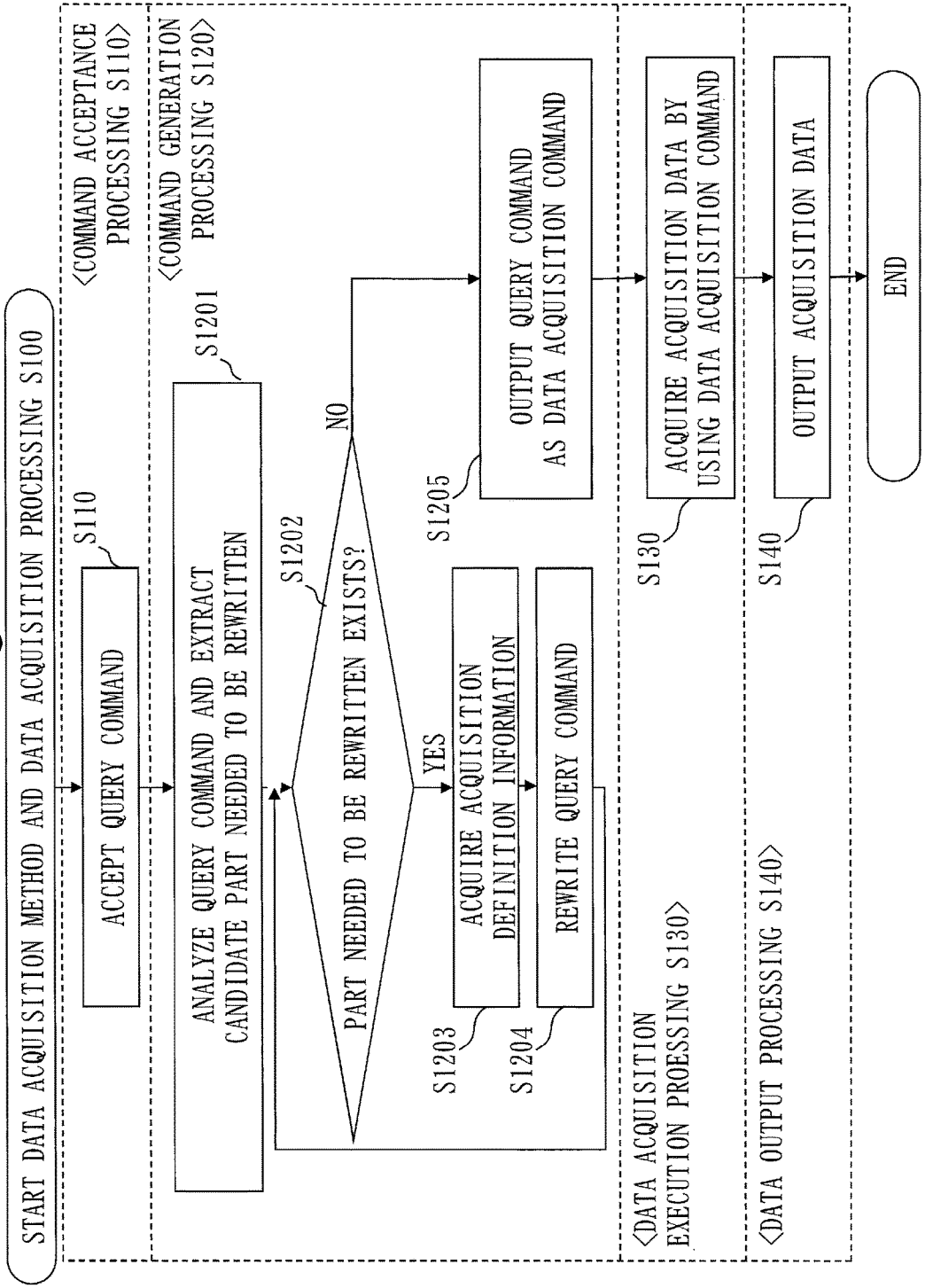
FIG. 3 is a flow diagram illustrating a data acquisition method and data acquisition processing of the data acquisition device according to the first embodiment.

FIG. 3 is a flow diagram illustrating a data acquisition method and data acquisition processing S100 of the data acquisition device 100 according to the present embodiment.

<Command Acceptance Processing S110>

The command acceptance unit 110 executes command acceptance processing S110 to accept a query command 201 for acquiring data from the database 300 that stores data corresponding to a definition value.

The query command 201 includes a value designation range that designates a range of the definition value corresponding to the data to be acquired. The query command 201 is a command to direct the data acquisition device 100 to acquire from the database 300 data whereof the definition value is within the value designation range.

In the present embodiment, a Relational Database Management System (RDBMS) is used for the database 300, and Structured Query Language (SQL) is used for the query command 201.

The command acceptance unit 110 outputs the query command 201 accepted from the application execution device 200 to the command generation unit 120.

Here, the command acceptance processing S110 will be described in detail.

First, the command acceptance unit 110 opens a standby port. The standby port is a communication socket such as Transmission Control Protocol (TCP), etc., specifically. Now that it is also possible to use a communication system of a layer higher or lower than TCP. Further, when the application execution device 200 and the data acquisition device 100 are installed on a same server, a window message may be used if the server is a Windows (registered trademark) server, and internal communication such as pipes may be used if the server is a UNIX (registered trademark)-based server.

Next, the command acceptance unit 110 communicates with the application execution device 200, and an SQL command is transmitted to the command acceptance unit 110 from the application execution device 200. Although a protocol to be used in communication is not specifically designated, it may be considered transmitting the SQL command in a plaintext such as Telnet, for example, or using Hypertext Transfer Protocol (HTTP) and storing in the body part the SQL command. Further, it may be also possible that the SQL command is encrypted by using a protocol combined with a regular protocol such as Secure Sockets Layer (SSL). As the processing of the command acceptance unit 110, parsing processing is performed to the SQL command, and by searching for a semicolon (;) being a partition in the command, one SQL command is acquired.

The command acceptance unit 110 passes the SQL command acquired in this manner, i.e., the query command 201, to the command generation unit 120.

<Command Generation Processing S120>

The command generation unit 120 determines whether there is a range overlapping with a value definition range in the value designation range, by using the acquisition definition information 161 and the query command 201, and when it is determined that there is an overlapping range, performs command generation processing S120 to generate a data acquisition command 202 for acquiring data corresponding to a definition value included in the overlapping range in an acquisition method corresponding to the value definition range.

In S1201, the command generation unit 120 analyzes the query command 201, and extracts a part to be a possible candidate of an object to be rewritten. The query command 201 includes a table name to designate a database 300, and a column name to designate data to be acquired. The query command 201 may include a plurality of column names. The command generation unit 120 analyzes the query command 201, and extracts the table name and the column name. At this time, the command generation unit 120 extracts the table name and the column name from the query command 201 by using a syntax analyzer, etc.

In S1202, the command generation unit 120 determines whether there is a part needed to be rewritten in the query command 201. The command generation unit 120 searches the definition axis definition information 151 by using the table name and the column name extracted in S1201. When there are a plurality of column names, the command generation unit 120 searches the definition axis definition information 151 by using one column name in the plurality of column names, and the table name. When the table name and the column name is hit in the definition axis definition information 151, the command generation unit 120 determines that the column name is a part needed to be rewritten.

When it is determined that there exists a part needed to be rewritten (YES in S1202), the procedure proceeds to S1203.

When it is determined that there does not exist a part needed to be rewritten (NO in S1202), the procedure proceeds to S1205.

In S1203, the command generation unit 120 acquires the definition axis definition information 151, the acquisition definition information 161 and the undefined information 171 necessary for rewriting the query command 201.

In S1204, the command generation unit 120 executes rewriting of the query command 201 by using the information acquired. The processing to rewrite the query command 201 will be described below in detail.

In S1205, the command generation unit 120 outputs the query command 201 as a data acquisition command 202 to the data acquisition unit 130.

The command generation unit 120 repeats execution of the processing from S1202 through S1204 until it is determined that there does not exist a part needed to be rewritten in the query command 201 in S1202. That is, the command generation unit 120 repeats execution of the processing from S1202 through S1204 until it is determined that rewriting is unnecessary with respect to all the column names included in the query command 201.

FIG. 4 is a diagram illustrating an example of the database 300 according to the present embodiment.

FIG. 5 is a diagram illustrating an example of the definition axis definition information 151 according to the present embodiment.

FIG. 6 is a diagram illustrating an example of the acquisition definition information 161 according to the present embodiment.

FIG. 7 is a diagram illustrating an example of the undefined information 171 according to the present embodiment.

Figure 8:
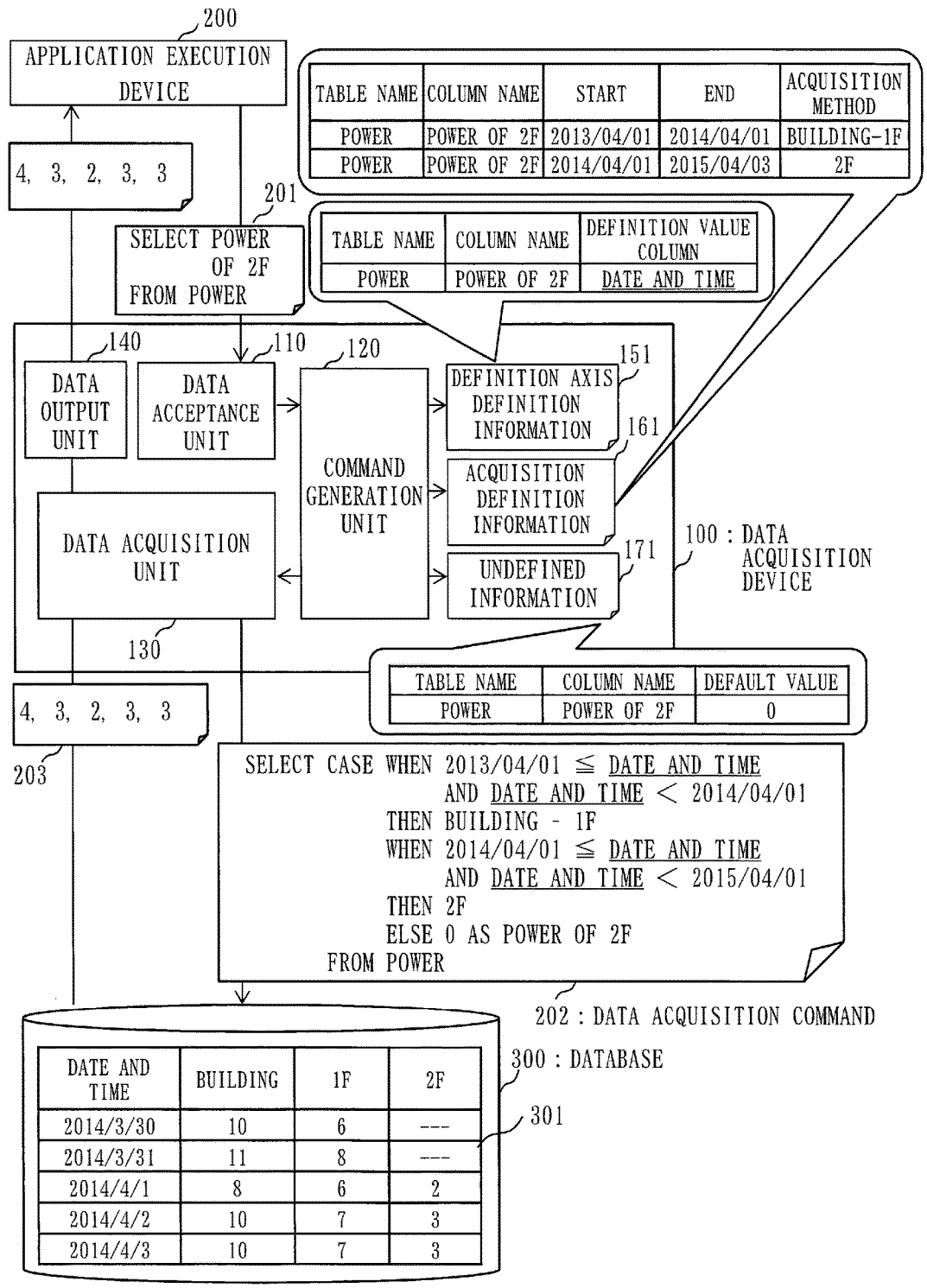
FIG. 8 is a diagram illustrating a concrete example of an operation of data acquisition processing of the data acquisition device according to the first embodiment.

FIG. 8 is a diagram illustrating a concrete example of an operation of the command conversion processing S120 of the command generation unit 120 according to the present embodiment.

The operation of the command conversion processing S120 will be described concretely using FIG. 4 through FIG. 8.

As illustrated in FIG. 4, the database 300 is a power table 301.

In the rows of the power table 301, power consumption in one day in two-story buildings is stored as data. The column names in the power table 301 are a date and time, a building, 1F and 2F. In the date and time, a date and time as yyyy/mm/dd is set. In the building, the power consumption in a whole building is stored. In 1F, the power consumption in the first floor of the building is stored. Similarly, in 2F, the power consumption in the second floor of the building is stored. In the database 300 in FIG. 4, the data of the second floor is stored from the third line of 2014/4/1. This means that data is started to be set in the second floor from 2014/4/1 because a wattmeter is added to the second floor of the building on 2014/4/1.

When power consumption of a whole building in one day on a certain date, month and year is to be acquired, the application execution device 200 can acquire the data from the column name "building" on a designated date in the power table 301, by designating a table name, a date and time, the building as a column name in the query command

201. When a date and time is not designated in the query command 201, data of the column name in all the dates and times is acquired. When power consumption in the first floor of a building is to be acquired, similarly, the data can be acquired from the column name "1F" on the designated date in the power table 301 by designating a table name, a date and time, and "1F" as a column name, in the query command 201.

However, when the application execution device 200 is to acquire power consumption in the second floor of a building on a certain date, month and year, an acquisition method of data differs depending on each value definition range by the date and time of the data. That is, the acquisition methods of data of the column 2F differ between a value definition range 3001 from 2014/3/30 to 2014/3/31, and a value definition range 3001 from 2014/4/1 to 2014/4/3.

The value definition range 3001 from 2014/3/30 to 2014/3/31 is a value definition range 3001*a*, and the value definition range 3001 from 2014/4/1 to 2014/4/3 is a value definition range 3001*b*. The value definition range 3001*a* and the value definition range 3001*b* are different in the acquisition method of the column 2F. Such value definition ranges 3001 of the definition value whose acquisition methods are different are also called definition sections of data.

As illustrated in FIG. 5, in the definition axis definition information 151, it is set a table name, a column name wherein data as an object to be defined definition sections is stored, and a definition value column name wherein definition values to be used in definition of a value definition range are set. In the example of FIG. 5, in the definition axis definition information 151, a date and time column representing measurement time of data is used as a variable for determining definition sections of data. In the definition axis definition information 151, power is set as the table name, power of 2F as the column name of the data being an object to be defined the definition sections, and a date and time as the column name of the definition value to be used for definition of the definition sections.

As illustrated in FIG. 6, in the acquisition definition information 161, each value definition range 3001, i.e., each acquisition method of data for each definition section is defined.

In the first line of FIG. 6, it is defined that in the definition section (value definition range 3001*a*) "from 2013/4/01 to 2014/4/01" of the power of 2F in the power table 301, the power of 2F in the power table 301 is acquired by "BUILDING-1F." Further, in the second line of FIG. 6, it is defined in the definition section (value definition range 3001*b*) "from 2014/4/01 to 2015/4/01" of the power of 2F in the power table 301, the power of 2F in the power table 301 is acquired by "2F." That is, since in the acquisition definition information 161 in FIG. 6, the power consumption in the second floor cannot be directly acquired until 2014/3/31, it is defined that the power consumption in the second floor is acquired by deducting the power consumption in the first floor from the power consumption of the whole building. Further, it is defined that on and after 2014/4/01, since data is directly stored in the column 2F, the values are acquired.

In the undefined information 171 in FIG. 7, a default value is set to be returned as a value of data which is requested to be acquired, when data acquisition of definition sections that are not defined in the acquisition definition information 161 is requested.

In the undefined information 171, it is set a table name, a column name of data as an object to be set a default value, and the default value. In FIG. 7, it is set power in the table name, power of 2F in the column name, and 0 in the default value. The undefined information 171 in FIG. 7 means that when definition sections except two definition sections of "from 2013/4/01 to 2014/4/01" and "from 2014/4/01 to 2015/4/01" of the power of 2F in the power table are designated in a query command 201, "0" is acquired as the power of 2F. In the example of the acquisition definition information 161 of FIG. 6, acquisition methods of data on or before 2013/4/1, or on or after 2015/4/1 are not defined. What is applied to such definition sections which are not defined is a default value definition.

Next, the operation of the data acquisition device 100 will be described in detail using FIG. 8.

<Example of Command Acceptance Processing S110>

The command acceptance unit 110 accepts a query command 201 from the application execution device 200 and outputs the query command 201 to the command generation unit 120. As illustrated in FIG. 8, in the query command 201, a command as follows for acquiring data of the power of 2F from the power table 301 is described.

Query Command 201:
SELECT POWER OF 2F
FROM POWER

The query command 201 does not designate dates and times. Thus, the query command 201 means that the power of 2F in all the dates and times in the power table 301 is acquired. Therefore, the value designation range 2011 included in the query command 201 is from 2014/3/30 to 2014/4/3.

Now that dates and times may be designated in a query command in contrast to the query command 201 in FIG. 8.

Hereinafter, a description example of a query command wherein a date and time is designated is indicated.

Description Example of a Query Command:
SELECT POWER OF 2F
FROM POWER
WHEN DATE AND TIME=2014/03/31

In the query command, the value designation range is 2014/03/31. Thus, the query command means acquisition of the power of 2F on 2014/03/31 in the power table.

<Example of Command Generation Processing S120>

The command generation unit 120 determines whether there is a range in the value designation range 2011 of the date and time included in the query command 201 that overlaps with each of the plurality of value definition ranges 3001 defined in the acquisition definition information 161. When it is determined that an overlapping range exists, the command generation unit 120 generates one data acquisition command 202 for acquiring data corresponding to a definition value included in the overlapping range in an acquisition method corresponding to each of the value definition ranges 3001.

In S1201, the command generation unit 120 analyzes the query command 201 and extracts a table name and a column name. The column name extracted becomes a possible candidate of an object to be rewritten.

In S1202, the command generation unit 120 determines whether there is a part needed to be rewritten in the query command 201. The command generation unit 120 searches the definition axis definition information 151 using the table name and the column name extracted in S1201. When the table name and the column name are hit in the definition axis definition information 151, the command generation unit 120 determines that the column name is a part needed to be rewritten.

Specifically, the command generation unit 120 extracts the table name "power" and the column name "power of 2F" from the query command 201 illustrated in FIG. 8, and searches the definition axis definition information 151 in FIG. 5. Since the table name "power" and the column name "power of 2F" are hit in the definition axis definition information 151 in FIG. 5, it is determined that the column name "power of 2F" is a part needed to be rewritten. That is, in the example of FIG. 8, the column name "power of 2F" in the SQL command transmitted from the application execution device 200 is an object to be rewritten.

In S1203, the command generation unit 120 acquires definition axis definition information 151, acquisition definition information 161 and undefined information 171 necessary for rewriting the query command 201.

In S1204, the command generation unit 120 executes processing of rewriting the column name in the query command 201 by using the information acquired.

The command generation unit 120 acquires a definition value corresponding to the table name and the column name from the definition axis definition information 151. The command generation unit 120 determines whether there is a range in the value designation range 2011 of the definition value included in the query command 201 that overlaps with the value definition ranges 3001 defined in the acquisition definition information 161, by using the definition value acquired. When it is determined that an overlapping range exists, the command generation unit 120 rewrites the column name in the query command 201 by using the acquisition method corresponding to the value definition range 3001 included in the overlapping range. The command generation unit 120 rewrites a command for acquiring data in the column name of the range overlapping with the value definition range 3001 into an acquisition command using an acquisition method corresponding to the value definition range 3001. The command generation unit 120 regards the query command 201 rewritten as a data acquisition command 202.

The processing to rewrite the column name in S1204 will be further discussed specifically using FIG. 8.

The command generation unit 120 acquires that a definition value of power of 2F in the power table is a date and time from the definition axis definition information 151. Then, the command generation unit 120 determines whether there is a range that overlaps with the value definition ranges 3001a and 3001b defined in the acquisition definition information 161 in the value designation range 2011 "from 2014/3/30 to 2014/4/3" of the date and time included in the query command 201.

The command generation unit 120 determines that "from 2014/3/30 to 2014/3/31" of the value designation range 2011 overlaps with the value definition range 3001a, and "from 2014/4/1 to 2014/4/3" of the value designation range 2011 overlaps with the value definition range 3001b.

When it is determined that an overlapping range exists, the command generation unit 120 generates a data acquisition command 202 for acquiring data corresponding to dates and times included in the overlapping range in an acquisition method corresponding to the value definition ranges 3001. Specifically, the command generation unit 120 rewrites the query command 201 into a data acquisition command 202 for acquiring the power of 2F in the acquisition method "BUILDING—1F" corresponding to the value definition range 3001a "from 2014/3/30 to 2014/3/31," and for acquiring the power of 2F in the acquisition method "2F" corresponding to the value definition range 3001b "from 2014/4/1 to 2014/4/3."

Now that when the command generation unit 120 determines that there is a range in the value designation range 2011 that does not overlap with any value definition range 3001 of the plurality of value definition ranges 3001, it means that a range for which an acquisition method is undefined exists in the value designation range 2011. The command generation unit 120 makes a command for acquiring a default value as a value of data corresponding to a date and time included in the range for which an acquisition method is undefined be included in the data acquisition command 202. In FIG. 7, the default value is 0; however, other numbers are also acceptable. Further, a character string, etc. indicating that the acquisition method of data is undefined may be set as a default value.

As described above, the command generation unit 120 confirms whether a definition to be applied exists for a possible candidate of an object to be rewritten, by using the definition axis definition information 151 and the acquisition definition information 161. When the definition to be applied exists, the query command 201 is converted by using the definition to be the object.

As for conversion of the query command 201, for example, rewriting in a CASE expression is performed. In a WHEN clause of the CASE expression, a condition using the definition axis definition information 151 and the acquisition definition information 161 is used. In a THEN clause, an acquisition definition corresponding to the condition is used.

In an ELSE clause that does not correspond to any definition section, a default value is used.

As described above, the data acquisition command 202 illustrated in FIG. 8 is generated.

<Example of Data Acquisition Execution Processing S130>

The data acquisition unit 130 executes data acquisition execution processing S130 to acquire as acquisition data 203 data of the column name "POWER OF 2F" from the power table 301 in the database 300, by using the data acquisition command 202.

The data acquisition unit 130 acquires the data acquisition command 202 from the command generation unit 120.

The data acquisition unit 130 acquires the acquisition data 203 corresponding to the data acquisition command 202 from the database 300 by issuing the data acquisition command 202 acquired to the database 300. The data acquisition unit 130 issues the data acquisition command 202 to the database 300 by using, in particular, a method such as Java Database Connectivity (JDBC) being one of the standard interface for accessing a database from a Java (registered trademark) program, or Open Database Connectivity (ODBC), etc.

In FIG. 8, the data acquisition unit 130 acquires "4, 3, 2, 3, 3" as acquisition data 203.

<Example of Data Output Processing S140>

The data output unit 140 outputs to the application execution device 200 the acquisition data 203 acquired by the data acquisition unit 130 as a result of the query command 201 transmitted from the application execution device 200.

In FIG. 8, the data output unit 140 outputs "4, 3, 2, 3, 3" as a result of the query command 201.

*Explanation on Effect of Present Embodiment*

As described above, it is possible for the data acquisition device 100 according to the present embodiment to convert a query command for acquiring data from a plurality of definition sections into one data acquisition command without dividing into a plurality of data acquisition commands for each data definition section. Thus, by the data acquisition device 100 according to the present embodiment, it is possible to assure flexibility against change of data acquisition definitions while suppressing degradation of the performance in data acquisition.

When there exists an undefined definition section in a data acquisition definition, the data acquisition device 100 according to the present embodiment includes undefined information for retaining a default data acquisition definition to be applied to the undefined definition section. Thus, by the data acquisition device 100 according to the present embodiment, even when data acquisition of an undefined definition section is performed, processing can be continued.

*Other Configuration*

Figure 9:
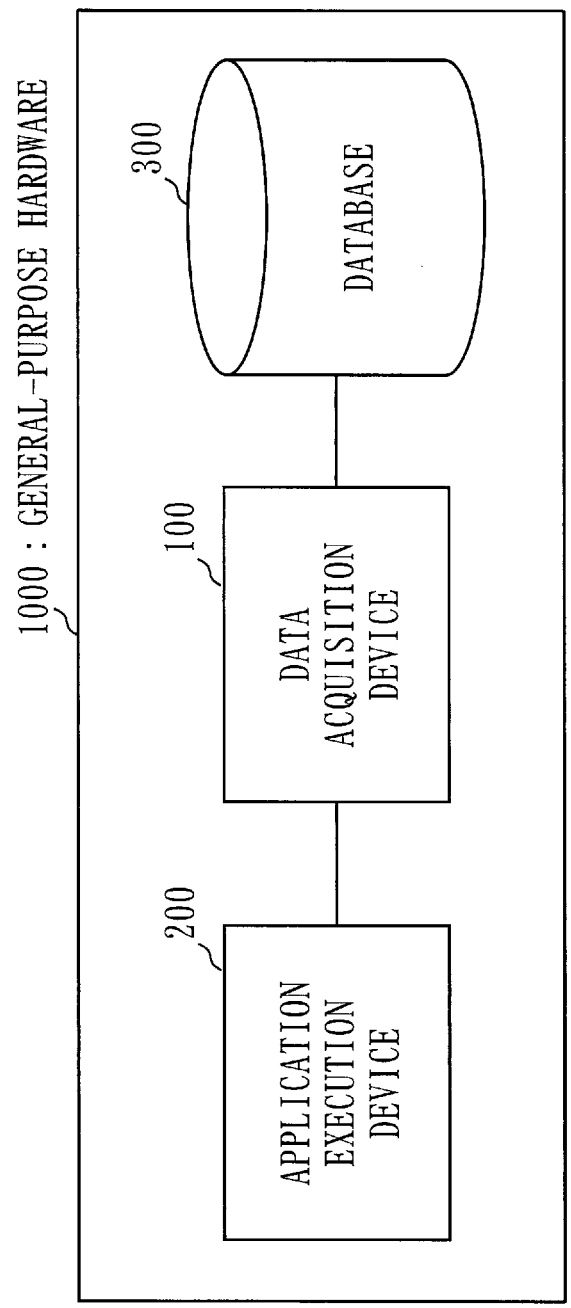
FIG. 9 is a diagram illustrating one example of a configuration of an application execution device, a data acquisition device and the database according to the first embodiment.

FIG. 9 is a diagram illustrating one example of the configuration of the application execution device 200, the data acquisition device 100 and the database 300 according to the present embodiment. Further, FIG. 10 is a diagram illustrating another example of the configuration of the application execution device 200, the data acquisition device 100 and the database 300.

As illustrated in FIG. 9, the data acquisition device 100 may be installed in versatile hardware together with the application execution device 200 and the database 300. The versatile hardware is a personal computer, a server, and so on. In this configuration, the data acquisition device 100 shares hardware resources such as a processor, a storage device, etc. with the application execution device 200 and the database 300. In this manner, when the data acquisition device 100 is installed in same versatile hardware with the application execution device 200 and the database 300, the data acquisition device 100 does not communicate with each of the application execution device 200 and the database 300. Further, since communication is not performed via a network in the configuration of FIG. 9, when the network is slow for the quantity of data to be acquired from the database 300, the performance improvement can be expected.

Figure 10:
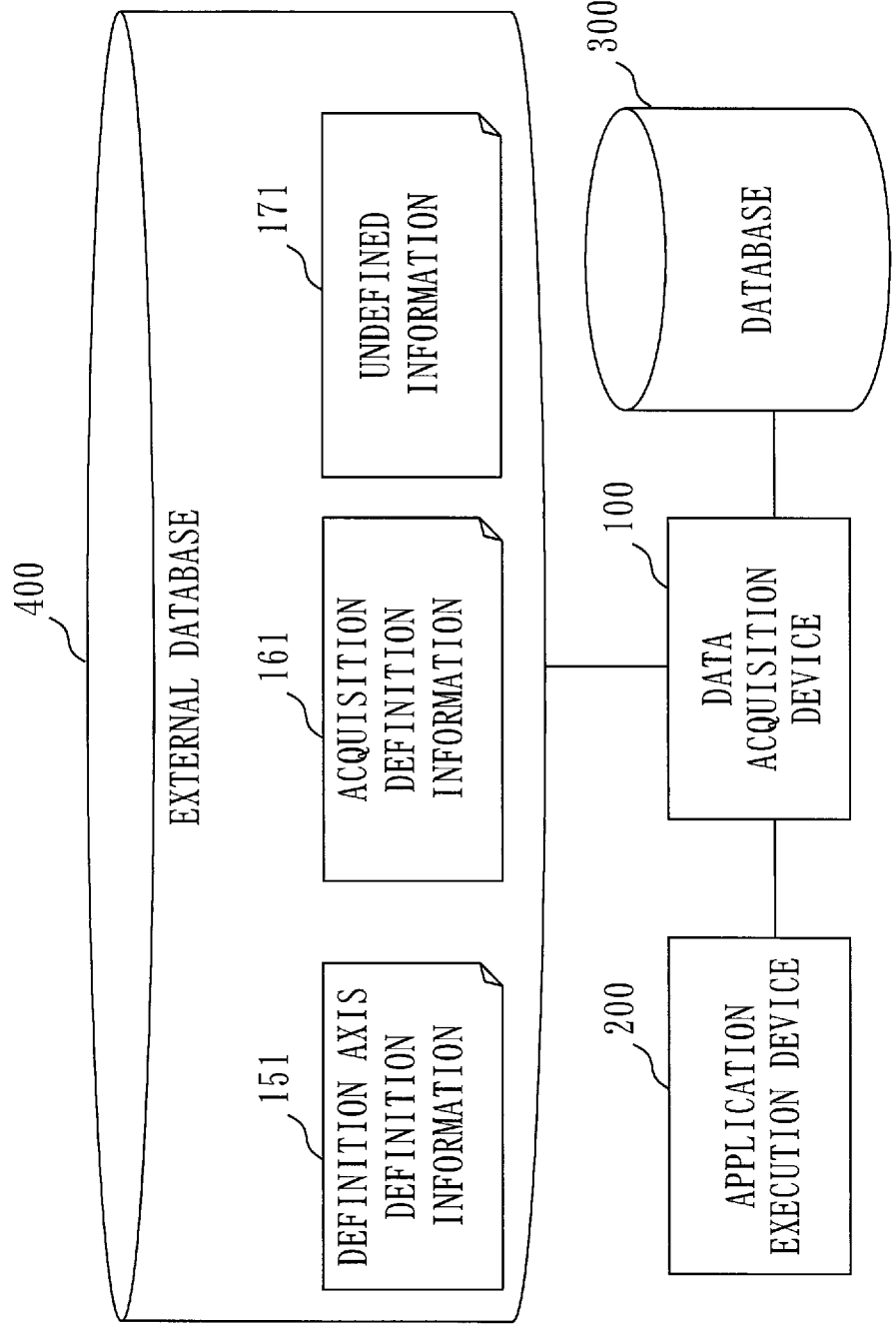
FIG. 10 is a diagram illustrating another example of a configuration of an application execution device, a data acquisition device and the database according to the first embodiment.

Further, as illustrated in FIG. 10, such a configuration is also acceptable that the definition axis definition information 151, the acquisition definition information 161, the undefined information 171, etc. are stored in an external database 400. The data acquisition device 100 retrieves information necessary for execution of data acquisition processing from the external database 400 at the time when data acquisition processing is performed. By the configuration as illustrated in FIG. 10, the resource of the data acquisition device 100 can be reduced.

Now that in the present embodiment, explanation is made using data definition sections defined in the one dimensional time axis; however, data definition sections may be defined in a plurality of dimensions, such as in a three dimensional space.

The examples are described with definition sections being limited sections; however, unlimited sections can be defined where the start point or the end point, in particular, is not defined. For example, when equipment is switched at one point, since the start point needs not to be especially defined as for a section before switching, the section can be created as an unlimited section. In this case, the condition representing the start point can be omitted, and the condition after conversion can be simplified.

Further, in the example of FIG. 8, a query command is converted to be one query command by using the CASE expression; however, UNION can be used. When UNION is used, by developing query commands to perform SELECT for each section, and by combining the query commands by UNION, it is possible to convert the query commands into one query command.

Further, in the example of the data acquisition command 202 for converting the query command 201 in FIG. 8, equality signs are inserted on the beginning side of inequality signs of the conditions which represent the definition sections of data so that an overlap does not occur in the definition sections. However, it may be possible to insert equality signs on the end side, or to add an extra definition and determine which side to insert an equality sign in accordance with the definition. In a case of counting data of one day, it becomes easier to create processing in accordance with a requirement of a system, such that which of the previous day or the next day data of exactly midnight should be added.

Further, when acquisition definitions in a plurality of sections are the same, it becomes possible to combine conditions corresponding to those sections into one condition. In this case, by simplifying a query command after conversion, improvement in speed can be expected.

Second Embodiment

In the present embodiment, parts different from those in the first embodiment will be described.

In the present embodiment, the same configuration as the configuration described in the first embodiment is denoted by the same signs, and explanation thereof may be omitted.

*Explanation of Configuration*

Figure 11:
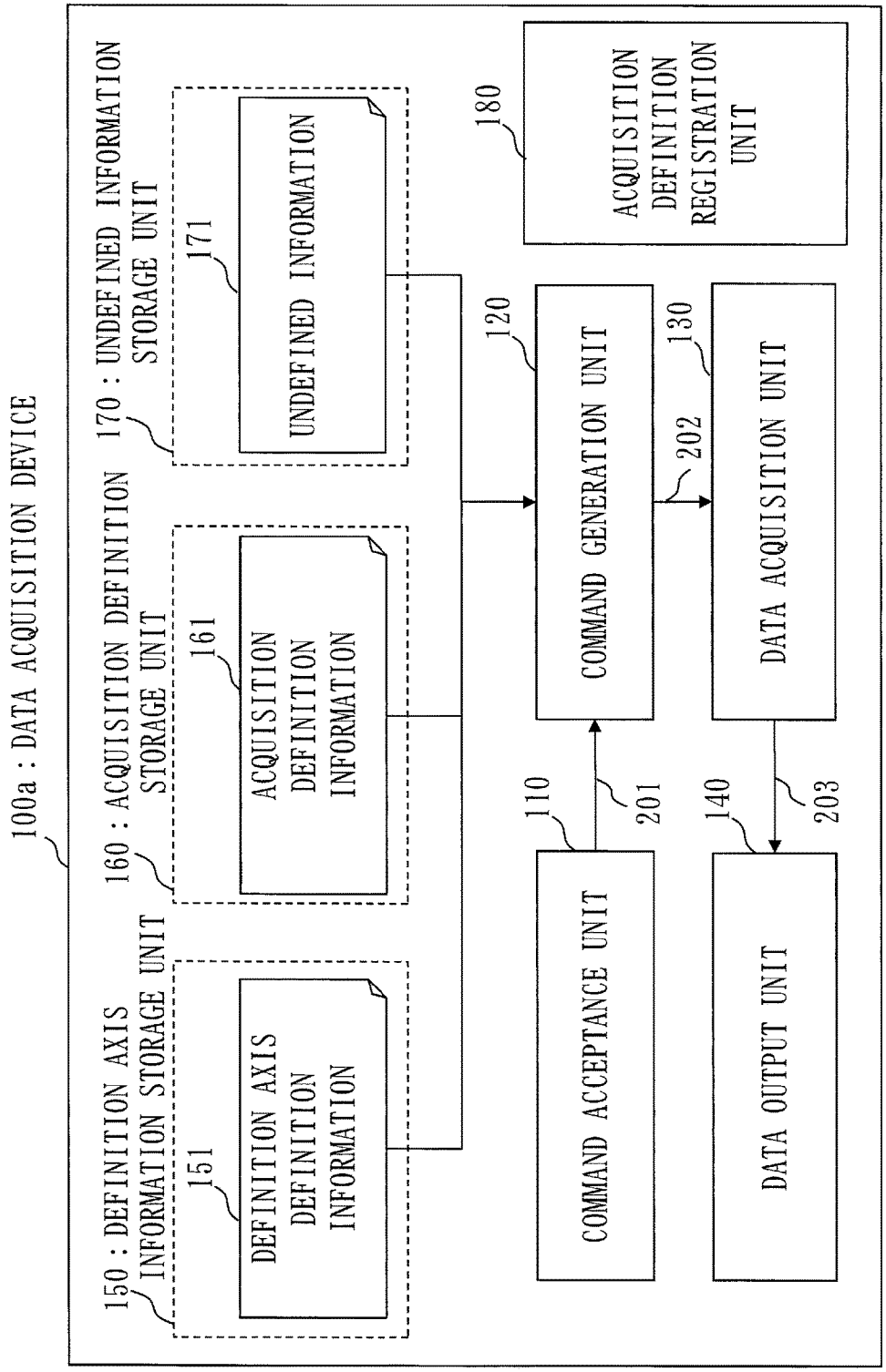
FIG. 11 is a diagram of a block configuration of a data acquisition device according to a second embodiment.

FIG. 11 is a diagram illustrating a block configuration of a data acquisition device 100a according to the present embodiment.

The data acquisition device 100a according to the present embodiment includes an acquisition definition registration unit 180 in addition to the block configuration of the data acquisition device 100 illustrated in FIG. 2.

The acquisition definition registration unit 180 registers in the acquisition definition information 161 each value definition range 3001 of a plurality of value definition ranges, and each acquisition method of data corresponding to each value definition range 3001 of the plurality of value definition ranges. The acquisition definition registration unit 180 registers each value definition range 3001 of the plurality of value definition ranges so that each value definition range 3001 of the plurality of value definition ranges does not overlap with the other value definition ranges.

In the first embodiment, definition of acquisition methods of data is made for specific value definition ranges. Among this, the value definition ranges of data defined in the acquisition definition information 161 allow for existence of ranges that overlap with one another as they are. However, when the plurality of value definition ranges of data overlap with one another, there is a possibility for a problem to occur such that the definition of the acquisition methods of data to be applied is indistinct, or data acquisition is performed in an overlapping manner. Therefore, the data acquisition device 100a according to the present embodiment includes the acquisition definition registration unit 180 to prevent addition of a value definition range that overlaps with value definition ranges of data that have been defined previously. The acquisition definition registration unit 180 may be also referred to as a data definition creation unit.

*Explanation of Operation*

Next, operation will be described.

The operation of the data acquisition processing S100 according to the present embodiment has been described in the first embodiment. In the present embodiment, the data acquisition device 100a performs acquisition definition registration processing S180 further using the acquisition definition registration unit 180.

Figure 12:
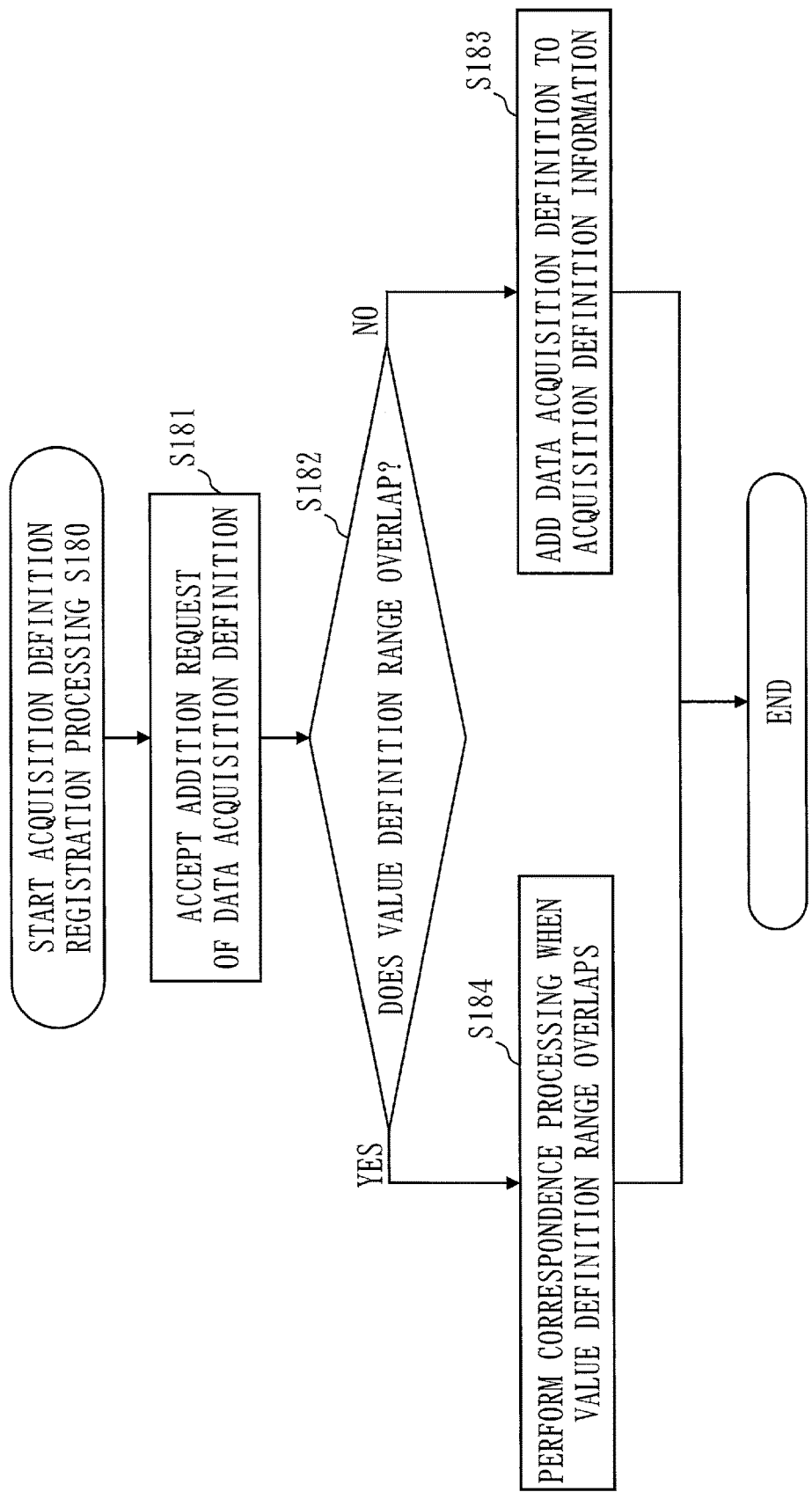
FIG. 12 is a flow diagram illustrating an operation of acquisition definition registration processing of an acquisition definition registration unit according to the second embodiment.

FIG. 12 is a flowchart illustrating the operation of the acquisition definition registration processing S180 of the acquisition definition registration unit 180 according to the present embodiment. The operation of the acquisition definition registration processing S180 to add an acquisition definition to the acquisition definition information 161 in the present embodiment will be described using FIG. 12.

In S181, the acquisition definition registration unit 180 accepts an addition request of an acquisition definition to the acquisition definition information 161. The addition request of the acquisition definition is a request to add an acquisition method after conversion to the acquisition definition information 161 in a case wherein an acquisition method of data stored in a database is changed, etc. The addition request includes a table name to add the acquisition method, a column name of data to add the acquisition method, and a value definition range of data to add the acquisition method, i.e., a definition section.

In S182, in response to the addition request accepted, the acquisition definition registration unit 180 checks whether there is an overlap in the value definition range of data desired to be added with the value definition ranges that has already existed in the acquisition definition information 161.

When an overlap does not exist (NO in S182), the acquisition definition registration unit 180 adds the acquisition definition of data included in the addition request to a row of the acquisition definition information 161 (S183).

When an overlap exists (YES in S182), the acquisition definition registration unit 180 performs processing in accordance with correspondence methods determined beforehand (S184).

Here, there are following methods as the correspondence methods determined beforehand. For example, a method to add an acquisition definition of data so that the value definition ranges of existing data are reduced so as not to overlap, and a method to add a value definition range of data desired to be added after reducing the value definition range, and so on. Further, there are methods such as a method not to add an acquisition definition of data as an error, and a method to make a user and so on who desires to newly add an acquisition definition of data select from the above methods, etc.

*Explanation of Effects According to Present Embodiment*

As described above, since the data acquisition device 100a according to the present embodiment includes the acquisition definition registration unit 180, it is possible to prevent occurrence of an overlap between definition sections of data, and to prevent problems such that data to be acquired becomes indefinite that may occur at the time of data acquisition, and so on.

Third Embodiment

In the present embodiment, parts that differ from those in the first and second embodiments will be described.

In the first embodiment, data to be used as a definition value of data is one kind of data such as a time and date, etc. In the present embodiment, a data acquisition device 100a is described which can, by changing a management method of definitions, set value definition ranges by using a definition value set by a plurality of conditions such as X axis and Y axis in a coordinate, and define acquisition methods corresponding to the value definition ranges.

In the present embodiment, the same configuration as the configurations described in the first and second embodiments is denoted by the same signs, whereof explanation is omitted.

As a concrete example, there is an example wherein a flow rate, i.e. water volume, that flows through a river per unit time from a water level of the river is calculated from a water level table. With respect to a river, a water level H and a water volume Q are denoted by a calculating formula as follows:

$Q=a(H+b)^2$ (here, $a$, $b$ are constant numbers)

However, in a case wherein a shape of the river changes drastically from a certain water level due to the shape of the bank and so on, it may be necessary to use another calculating formula from the water level as a boundary. Further, the relation between the water level and the water volume changes in such a case wherein deposited material accumulates on the bottom of the river due to flood and so on. Thus, in order to calculate a water volume from a water level in a certain river, there is a necessity to change the calculating formula being the acquisition method for calculating the water volume based on both conditions of time and the water level.

In the present embodiment, the data acquisition device 100a that can switch an acquisition method depending on a value definition range of a definition value, i.e., a definition section, defined by a plurality of conditions as mentioned above.

Here, in the above example, acquisition data 203 acquired from the water level table is a water volume per unit time. Further, a definition value of the water volume per unit time is defined by time and a water level, and a value definition range of the definition value is also defined by time and the water level.

*Explanation of Configuration*

Figure 13:
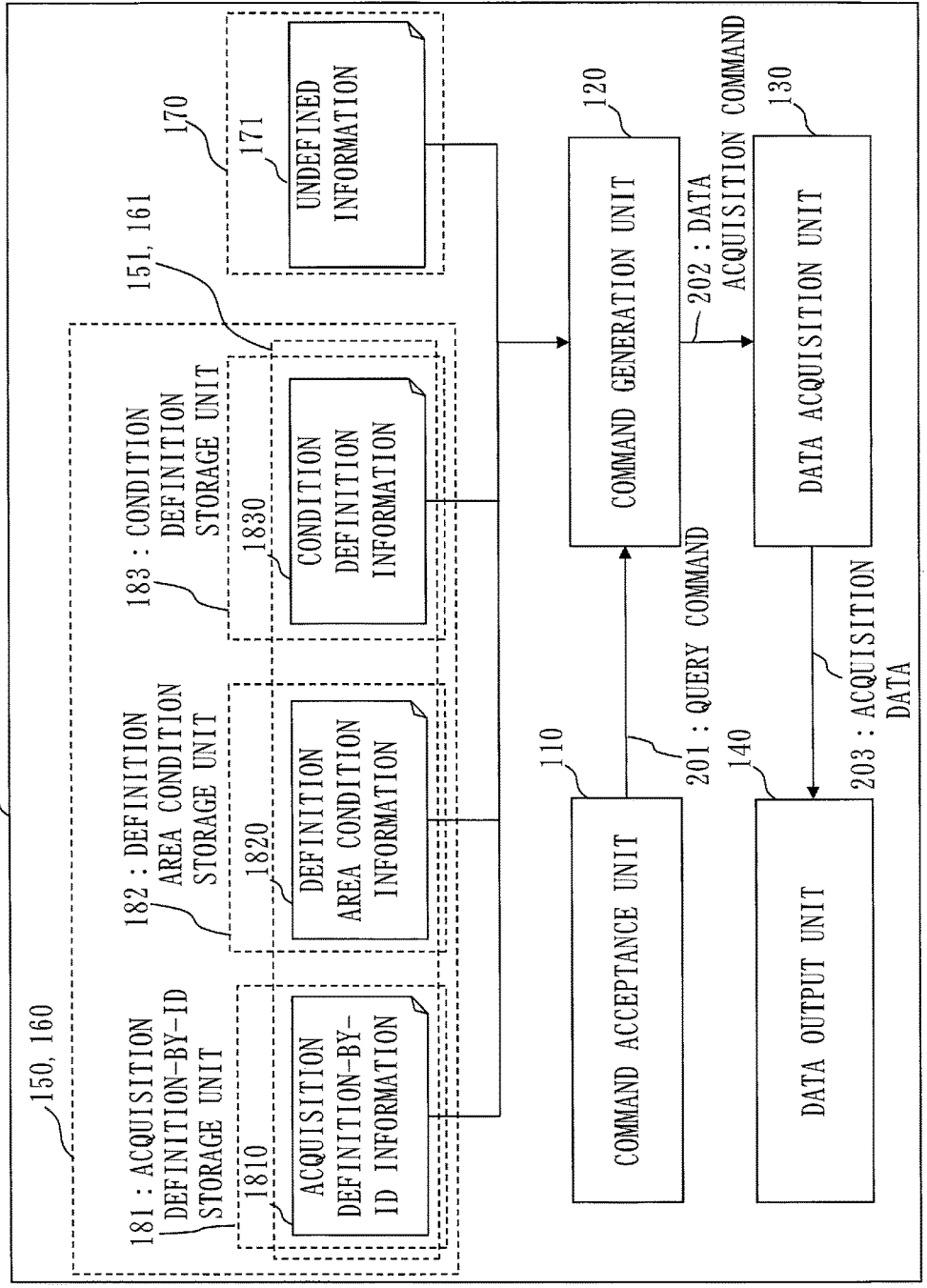
FIG. 13 is a diagram of a block configuration of a data acquisition device according to a third embodiment.

FIG. 13 is a diagram illustrating a block configuration of the data acquisition device 100a according to the present embodiment.

FIG. 13 is a diagram corresponding to FIG. 2, which is different from FIG. 2 in that FIG. 13 includes an acquisition definition-by-ID storage unit 181, a definition area condition storage unit 182 and a condition definition storage unit 183 instead of the definition axis information storage unit 150 and the acquisition definition storage unit 160 in FIG. 2.

The acquisition definition-by-ID storage unit 181 stores acquisition definition-by-ID information 1810.

The definition area condition storage unit 182 stores definition area condition information 1820.

The condition definition storage unit 183 stores condition definition information 1830.

Now that the acquisition definition-by-ID information 1810, the definition area condition information 1820 and the condition definition information 1830 are used for processing of the command generation unit 120, including the same functions as the definition axis definition information 151 and the acquisition definition information 161 as described in the first embodiment.

Thus, the configuration of the acquisition definition-by-ID storage unit 181, the definition area condition storage unit 182 and the condition definition storage unit 183 corresponds to the definition axis information storage unit 150 and the acquisition definition storage unit 160.

*Explanation of Operation*

Next, data acquisition processing S100a by the data acquisition device 100a according to the present embodiment will be described.

Figure 14:
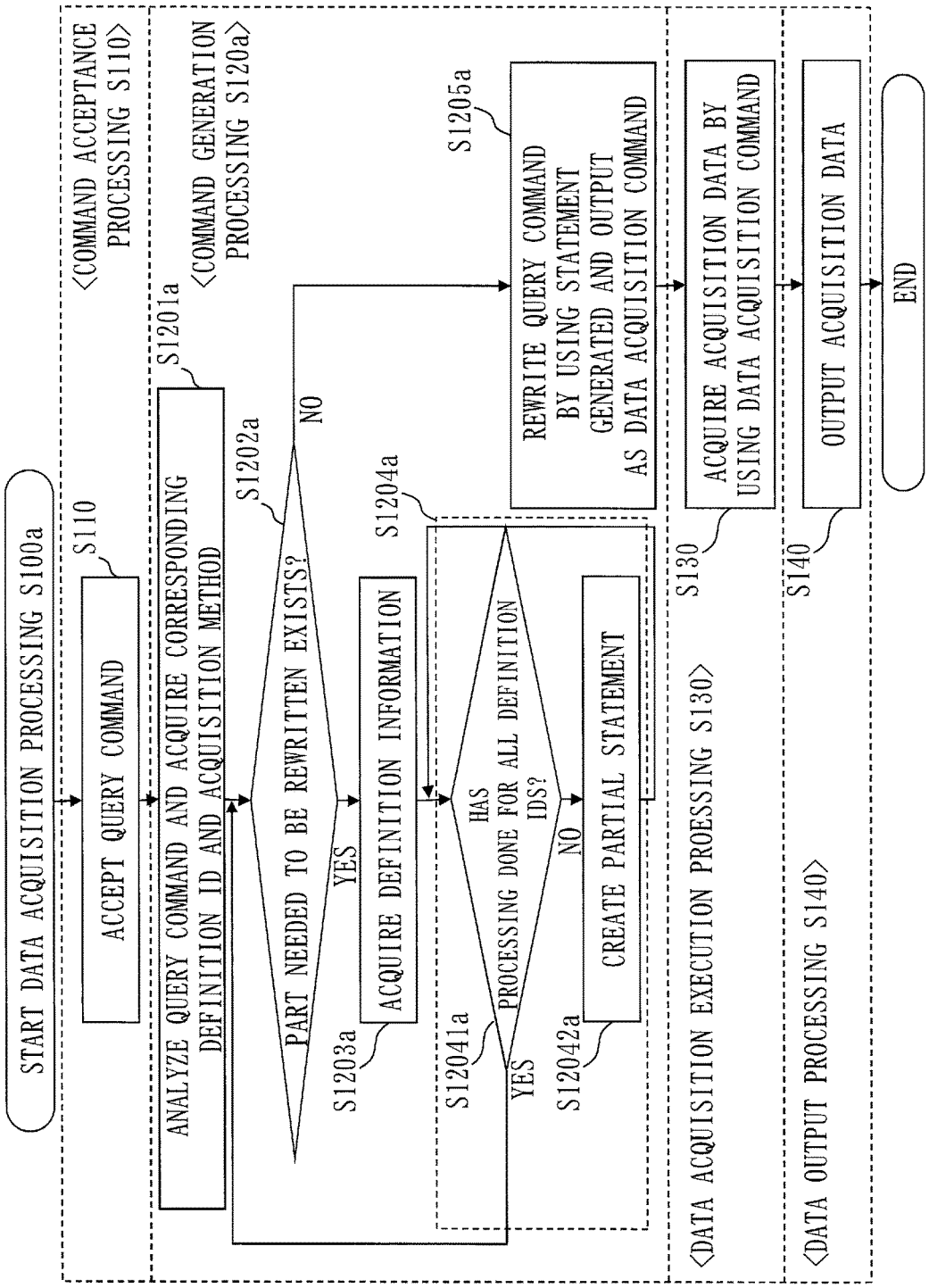
FIG. 14 is a flow diagram illustrating command generation processing of a command generation unit according to the third embodiment.

FIG. 14 is a flowchart illustrating command generation processing S120a by the command generation unit 120 according to the present embodiment.

Figure 15:
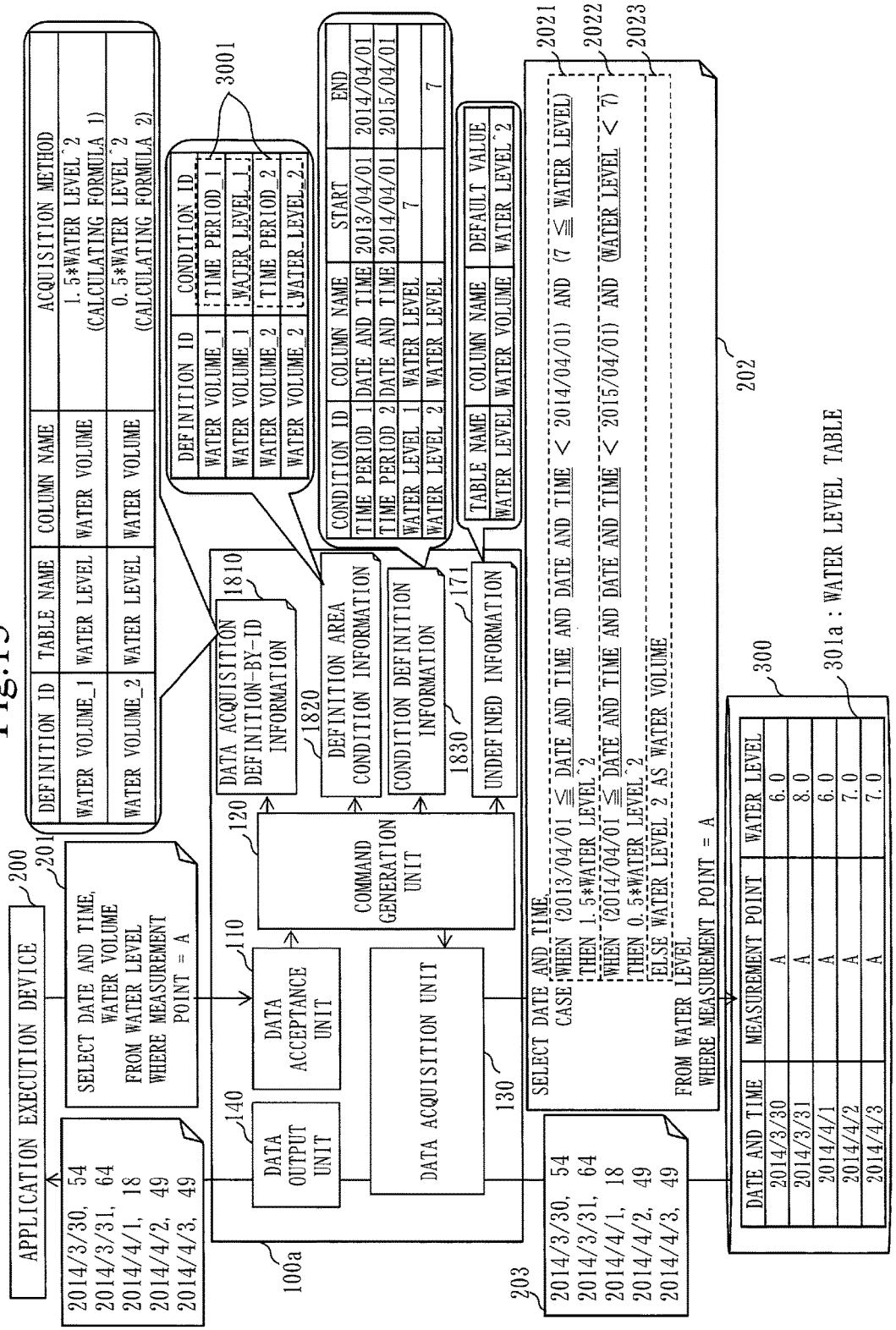
FIG. 15 is a diagram illustrating a concrete example of an operation of data acquisition processing of the data acquisition device according to the third embodiment.

FIG. 15 is a diagram illustrating a concrete example of the operation of the data acquisition processing S100a by the data acquisition device 100a according to the present embodiment.

The concrete example of FIG. 15 illustrates a case wherein the data acquisition device 100a receives from the application execution device 200 a query command 201 for acquiring a water volume every dates and times from a water level table 301a.

The thing that is different in the data acquisition processing S100a according to the present embodiment from the data acquisition processing S100 described in FIG. 3 in the first embodiment is the command generation processing S120. The command acceptance processing S110, the data acquisition execution processing S130 and the data output processing S140 are the same as in the first embodiment; thus, the explanation is omitted.

First, the configuration of the acquisition definition-by-ID information 1810, the definition area condition information 1820 and the condition definition information 1830 will be described using FIG. 15.

A definition ID, a table name, a column name and an acquisition method are set in the acquisition definition-by-ID information 1810. The definition ID is an identifier to uniquely identify an acquisition method.

A definition ID and a condition ID are associated with the definition area condition information 1820. The condition ID is an identifier to uniquely identify the contents of the condition. A plurality of condition IDs may be associated with one definition ID.

The condition ID and the contents of the condition are associated with the condition definition information 1830.

As described above, it is possible to associate a plurality of conditions with one acquisition method defined by a definition ID due to the acquisition definition-by-ID information 1810, the definition area condition information 1820 and the condition definition information 1830.

Specifically, in the definition area condition information 1820, by associating a condition ID of a time period 1 and a water level 1 with a water volume 1, it is possible to associate the condition of the time period 1 and the water level 1 with a calculating formula 1 being an acquisition method of the water volume 1. That is, in the definition area condition information 1820, by associating a plurality of condition IDs with a definition ID, it is possible to associate a value definition range 3001 defined by a plurality of conditions with an acquisition method corresponding to the definition ID.

Next, command generation processing S120a by the command generation unit 120 according to the present embodiment will be described using FIG. 14 and FIG. 15.

In S1201a, the command generation unit 120 analyzes the query command 201 and extracts a part to be a possible candidate of an object to be rewritten. The query command 201 includes a table name to designate a database 300 and a column name to designate data to be acquired. In the present embodiment, a plurality of column names are included. The command generation unit 120 analyzes the query command 201 and extracts the table name and the column name. The analysis method for the query command 201 is the same as that described in the first embodiment.

In the example of FIG. 15, a date and time and a water volume are extracted as column names, and a water level table as a table name.

In S1202a, the command generation unit 120 determines whether there is a part needed to be rewritten in the query command 201. The command generation unit 120 searches the acquisition definition-by-ID information 1810 by using the table name and the column name extracted in S1201a. When a plurality of column names exist, the command generation unit 120 searches the acquisition definition-by-ID information 1810 by using one column name of the plurality of column names and a table name. When the table name and the column name are hit in the acquisition definition-by-ID information 1810, the command generation unit 120 determines that the column name is the part needed to be rewritten, and acquires an acquisition method and a definition ID corresponding to the row which is hit.

In the example of FIG. 15, the command generation unit 120 searches the acquisition definition-by-ID information 1810 by the water level table and the date and time, and searches the acquisition definition-by-ID information 1810 by the water level table and the water volume. In the example illustrated in FIG. 15, since the water level table and the water volume are hit in the acquisition definition-by-ID information 1810, the command generation unit 120 acquires as the definition IDs and the acquisition methods, the water volume 1 and the calculating formula 1, and a water volume 2 and a calculating formula 2.

When it is determined that a part needed to be rewritten exists (YES in S1202a), the procedure proceeds to S1203a.

When it is determined that a part needed to be rewritten does not exist (NO in S1202a), the procedure proceeds to S1205.

In S1203a, the command generation unit 120 acquires the definition area condition information 1820 and the condition definition information 1830 needed for rewriting the query command 201.

In S1204a, the command generation unit 120 performs the processing to rewrite the query command 201 by using the information acquired.

In S12041a, the command generation unit 120 determines whether a statement is created for all the definition IDs acquired from the acquisition definition-by-ID information 1810.

When it is determined that the statement is created for all the definition IDs, the processing returns to S1202a.

When it is determined that there is an unprocessed definition ID, the processing proceeds to S12042a.

In S12042a, the command generation unit 120 searches the definition area condition information 1820 by using the definition ID as an object to be processed, which is acquired from the acquisition definition-by-ID information 1810, and acquires a condition ID. Next, the command generation unit 120 searches the condition definition information 1830 by using the condition ID acquired from the definition area condition information 1820, and acquires a condition corresponding to the condition ID. By using the condition acquired, the command generation unit 120 generates a statement for acquiring data of a column name in an acquisition method corresponding to the definition ID as the object to be processed when the condition acquired is met. Note that the statement to be generated is a partial statement corresponding to the definition ID as the object to be processed of the statement to be used in a query command after rewriting.

The command generation unit 120 repeats the processing of S12041a and S12042a until the statement for all the definition IDs acquired from the acquisition definition-by-ID information 1810 is created. That is, in the example of FIG. 15, since the definition IDs are the water volume 1 and the water volume 2, the command generation unit 120 repeats the processing of S12041*a* and S12042*a* until a statement for both the water volume 1 and the water volume 2 is created.

In the example of FIG. 15, the command generation unit 120 searches the definition area condition information 1820 by using the water volume 1 being a definition ID, and acquires the time period 1 and the water level 1 as condition IDs.

Next, the command generation unit 120 searches the condition definition information 1830 by using the time period 1 and the water level 1 acquired from the definition area condition information 1820. The command generation unit 120 acquires as a condition corresponding to the time period 1 a date and time from 2013/04/01 to 2014/04/01. Further, the command generation unit 120 acquires as a condition corresponding to the water level 1 a water level equal to and higher than 7. The command generation unit 120 generates a statement 2021 for calculating a water volume by the calculating formula 1 corresponding to the water volume 1 when the date and time is between 2013/04/01 and 2014/04/1, and the water level is equal to or higher than 7. As illustrated in the statement 2021 in FIG. 15, when the water volume being a column name in the query command 201 is rewritten in a CASE expression, a WHEN clause and a THEN clause are created. The condition used in the WHEN clause here is made by combining a plurality of conditions (the time period 1 and the water level 1) set in the definition area condition information 1820.

At this time, since generation processing of a statement for the water volume 2 is unprocessed (NO in S12041*a*), the command generation unit 120 proceeds to S12042*a*.

The command generation unit 120 performs processing for the water volume 2 same as in the case of the water volume 1, and when the date and time is between 2014/04/01 and 2015/04/01, and the water level is lower than 7, the command generation unit 120 creates a statement 2022 for calculating a water volume by the calculating formula 2 corresponding to the water volume 2.

Note that the command generation unit 120 determines that an acquisition method for data that does not meet any of the above conditions in the water level table 301*a* is undefined. The command generation unit 120 generates a statement 2023 of an ELSE clause for acquiring the data that does not meet any of the above conditions by a calculating formula set to be a default value in the undefined information 171.

In S1205*a*, the command generation unit 120 combines the partial statements generated, and rewrites the column name part of the query command 201 by using the statement combined.

In the example of FIG. 15, the command generation unit 120 combines three statements 2021, 2022 and 2023 generated, generates a CASE clause by using the statement created, and rewrites the column name part of the query command 201.

The command generation unit 120 outputs the query command 201 rewritten to the data acquisition unit 130 as a data acquisition command 202.

\*\*\*Explanation of Effects of Present Embodiment\*\*\*

By the data acquisition device according to the present embodiment, it is possible to define a definition area defined by a plurality of conditions, and to calculate a value that changes discontinuously with respect to the definition area.

Note that although it is described in the present embodiment the relation between a water level and a water volume of a river, a dam, etc. as a concrete example, it is acceptable to apply the present embodiment to temperature and resistivity, etc., where resistivity changes discontinuously with respect to the temperature due to change of phase, and so on.

Further, although it is described in the present embodiment a method to define a definition area by two conditions, three condition IDs may be associated with one definition ID in the definition area condition information. The number of the condition IDs to be associated with one definition ID may be four or five, etc.

\*\*\*Explanation of Hardware Configuration Example\*\*\*

Finally, one example of a hardware configuration of the data acquisition devices 100 and 100*a* according to the first embodiment will be described using FIG. 16.

The data acquisition devices 100 and 100*a* are computers.

The data acquisition devices 100 and 100*a* are equipped with hardware components such as a processor 901, an auxiliary storage device 902, a memory 903, a communication device 904, an input interface 905 and a display interface 906, etc.

The processor 901 is connected to the other hardware components via a signal line 910 to control the other hardware components.

The input interface 905 is connected to an input device 907.

The display interface 906 is connected to a display 908.

The processor 901 is an integrated circuit (IC) that performs processing.

The processor 901 is, for example, a CPU, a digital signal processor (DSP), or a graphics processing unit (GPU).

The auxiliary storage device 902 is, for example, a read only memory (ROM), a flash memory, or a hard disk drive (HDD).

The memory 903 is, for example, a random access memory (RAM).

The communication device 904 includes a receiver 9041 to receive data and a transmitter 9042 to transmit data.

The communication device 904 is, for example, a communication chip or a network interface card (NIC).

The communication device 904 is a device to perform communication with the application execution device 200 or the database 300, etc. via a network.

The input interface 905 is a port whereto a cable 911 of the input device 907 is connected.

The input interface 905 is, for example, a universal serial bus (USB) terminal.

The display interface 906 is a port whereto a cable 912 of the display 908 is connected.

The display interface 906 is, for example, a USB terminal or a high definition multimedia interface (HDMI (registered trademark)) terminal.

The input device 907 is, for example, a mouse, a keyboard, or a touch panel.

The display 908 is, for example, a liquid crystal display (LCD).

In the auxiliary storage device 902, a program to realize the functions of the command acceptance unit 110, the command generation unit 120, the data acquisition unit 130, the data output unit 140 and the acquisition definition registration unit 180 illustrated in FIG. 2, FIG. 11 and FIG. 13 is stored. Hereinafter, the command acceptance unit 110, the command generation unit 120, the data acquisition unit 130, the data output unit 140 and the acquisition definition registration unit 180 are collectively represented as "units."

The program to realize the functions of the "units" as mentioned above is also referred to as a data acquisition program. The program to realize the functions of the "units" may be one program, or may be composed of a plurality of programs. In addition, the program to realize the functions of the "units" are stored in a storage medium such as a magnetic disk, a flexible disk, an optical disc, a compact disk, a blue-ray (registered trademark) disc, a DVD, etc.

The program is loaded into the memory 903, read into the processor 901, and executed by the processor 901.

Further, an operating system (OS) is also stored in the auxiliary storage device 902.

Then, at least a part of the OS is loaded into the memory 903, and the processor 901 executes the program to realize the functions of the "units" while executing the OS.

Figure 16:
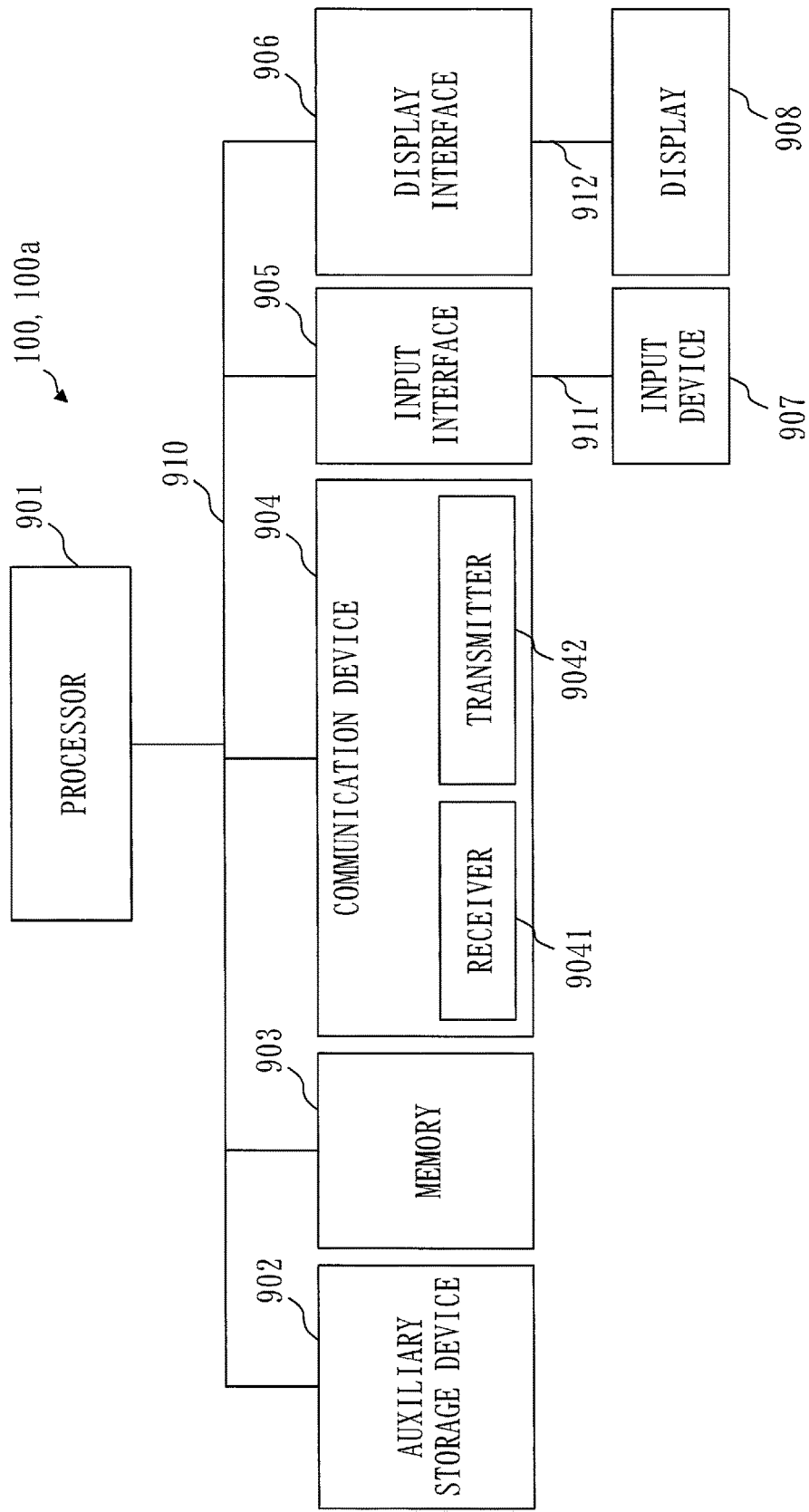
FIG. 16 is a diagram of a hardware configuration of a data acquisition device.

In FIG. 16, one processor 901 is illustrated; however, the data acquisition devices 100 and 100a may be equipped with a plurality of processors 901.

Then, the plurality of processors 901 may execute programs to realize the functions of the "units" cooperatively.

The information, data, signal values and variable values indicating the results of the processing by the "units" are stored as files in the memory 903, the auxiliary storage device 902, or a register or a cache memory in the processor 901.

The definition axis information storage unit 150, the acquisition definition storage unit 160, the undefined information storage unit 170, the acquisition definition-by-ID storage unit 181, the definition area condition storage unit 182 and the condition definition storage unit 183 illustrated in FIG. 2, FIG. 11 and FIG. 13 are constituted by the auxiliary storage device 902.

The auxiliary storage device 902 stores the definition axis definition information 151, the acquisition definition information 161, the undefined information 171, the acquisition definition-by-ID information 1810, the definition area condition information 1820 and the condition definition information 1830 illustrated in FIG. 2, FIG. 11 and FIG. 13.

The "units" may be provided by "processing circuitry."

Alternatively, the "units" may be replaced with "circuits," "steps," "procedures" or "processing." Alternatively, the "processing" may be replaced with "circuits," "steps," "procedures" or "units."

The "circuits" and "processing circuitry" are concepts that include not only the processor 901 but also processing circuits of other types, such as a logic IC, a gate array (GA), an application specific integrated circuit (ASIC) and an field-programmable gate array (FPGA).

Note that what is called a program product is a storage medium, a storage device, etc. wherein the program to realize the functions described as the "units" is stored, and into which a program readable by a computer is loaded, irrespective of the form as it appears.

The data acquisition device 100 according to the present embodiment may be realized by software that operates on general purpose hardware such as a personal computer or a server, or may be realized by specialized hardware.

In the above embodiments, each of the command acceptance unit, the command generation unit, the data acquisition unit, the data output unit and the acquisition definition registration unit composes the data acquisition device as an independent functional block. However, the data acquisition device may not be configured as mentioned above, and the configuration of the data acquisition device is arbitrary.

For example, the command acceptance unit, the data acquisition unit and the data output unit may be configured to be one functional block. Alternatively, the command generation unit may be subdivided into a plurality of functional blocks. The functional blocks of the data acquisition device are arbitrary as long as the functional blocks can realize the functions described in the above embodiments.

The data acquisition device may be configured by any other combinations, or an arbitrary block configuration, of these functional blocks.

Further, the data acquisition device may be a data acquisition system configured by a plurality of devices, not by one device.

Further, although the first to third embodiments have been described, two or three of those three embodiments may be partially combined and implemented. Meanwhile, among those three embodiments, one embodiment may be partially implemented. Otherwise, those three embodiments may be entirely or partially combined and implemented in any manner.

Note that the embodiments as mentioned above are essentially preferable examples, not aiming at limiting the range of the present invention, application and use thereof, and various alterations can be made as needed.

REFERENCE SIGNS LIST 100, 100a: data acquisition device; 110: command acceptance unit; 120: command generation unit; 130: data acquisition unit; 140: data output unit; 150: definition axis information storage unit; 151: definition axis definition information; 160: acquisition definition storage unit; 161: acquisition definition information; 1611: acquisition method; 170: undefined information storage unit; 171: undefined information; 180: acquisition definition registration unit; 181: acquisition definition-by-ID storage unit; 182: definition area condition storage unit; 183: condition definition storage unit; 1810: acquisition definition-by-ID information; 1820: definition area condition information; 1830: condition definition information; 200: application execution device; 201: query command; 2011: value designation range; 202: data acquisition command; 2021, 2022, 2023: statement; 203: acquisition data; 300: database; 301: power table; 301a: water level table; 3001, 3001a, 3001b: value definition range; 3002: definition value; 400: external database; 1000: general-purpose hardware; 901: processor; 902: auxiliary storage device; 903: memory; 904: communication device; 905: input interface; 906: display interface; 907: input device; 908: display; 910: signal line; 911, 912: cable; 9041: receiver; 9042: transmitter; S100: data acquisition processing

The invention claimed is:

1. A data acquisition device comprising:
a memory having stored therein acquisition definition information, wherein a value definition range that defines a range of a definition value is associated with an acquisition method to acquire data from a database and the acquisition method for at least one respective definition value varies according to the defined range; and processing circuitry configured to:
accept, from an application execution device, a query command to acquire data from the database that stores data which is associated with a definition value, the query command including a value designation range that designates a range of a definition value corresponding to the data to be acquired;
judge, by using the query command and the acquisition definition information, whether an overlapping range that overlaps with the value definition range exists in the value designation range,
when the overlapping range is judged to exist, analyze the query command to determine whether there are any candidate parts which need to be rewritten based on the stored acquisition definition information;

rewrite, when there is candidate part which needs to be rewritten, the query command based on the acquisition definition information, generate, when the query command has been rewritten, based on the rewritten query command and the acquisition definition information, a data acquisition command to acquire data corresponding to a definition value which is included in the overlapping range, in an acquisition method corresponding to the value definition range;

output, when there is no candidate part which needs to be rewritten, the query command as the data acquisition command;

acquire data from the database by using the data acquisition command; and provide the acquired data to the application execution device in response to the accepted query.

2. The data acquisition device as defined in claim 1, wherein the processing circuitry stores the acquisition definition information including a plurality of value definition ranges as the value definition range, wherein each value definition range of the plurality of value definition ranges is associated with the acquisition method, and judges whether an overlapping range that overlaps with each value definition range of the plurality of value definition ranges exists in the value designation range, and when the overlapping range is judged to exist, generates the data acquisition command to acquire data corresponding to a definition value included in the overlapping range in an acquisition method corresponding to each value definition range of the plurality of value definition ranges.

3. The data acquisition device as defined in claim 2, wherein when it is judged that a range that does not overlap with any value definition range of the plurality of value definition ranges exists in the value designation range, the processing circuitry makes a command to acquire a default value as data corresponding to a definition value included in the range that does not overlap be included in the data acquisition command.

4. The data acquisition device as defined in claim 3, wherein the memory stores undefined information including the default value acquired as the data corresponding to the definition value included in the range that does not overlap.

5. The data acquisition device as defined in claim 2, wherein the processing circuitry registers in the acquisition definition information each value definition range of the plurality of value definition ranges and the acquisition method corresponding to each value definition range of the plurality of value definition ranges.

6. The data acquisition device as defined in claim 5, wherein the processing circuitry registers each value definition range of the plurality of value definition ranges so that each value definition range of the plurality of value definition ranges does not overlap with other value definition ranges.

7. The data acquisition device as defined in claim 6, wherein when each value definition range of the plurality of value definition ranges overlaps with other value definition ranges, the processing circuitry reduces each value definition range of the plurality of value definition ranges or the other value definition ranges so that each value definition range of the plurality of value definition ranges does not overlap with the other value definition ranges.

8. The data acquisition device as defined in claim 1, wherein the definition value is a date and time.

9. The data acquisition device as defined in claim 1, wherein the definition value is determined from a plurality of conditions.

10. A data acquisition method comprising:

storing acquisition definition information, where a value definition range that defines a range of a definition value is associated with an acquisition method to acquire data from a database, wherein the acquisition method for at least one respective definition value varies according to the defined range; and accepting, from an application execution device, a query command to acquire data from the database that stores data which is associated with a definition value, the query command including a value designation range that designates a range of a definition value corresponding to the data to be acquired, judging, using the acquisition definition information and the query command, whether an overlapping range that overlaps with the value definition range exists in the value designation range, when the overlapping range is judged to exist, analyzing the query command to determine whether there are any candidate parts which need to be rewritten based on the stored acquisition definition information, rewriting when there is a candidate part which needs to be rewritten, the query command based on the acquisition definition information, generating, when the query command has been rewritten, based on the rewritten query command and the acquisition definition information, a data acquisition command to acquire data corresponding to a definition value which is included in the overlapping range, in an acquisition method corresponding to the value definition range, outputting, when there is no candidate part which needs to be rewritten, the query command as the data acquisition command;

acquiring data from the database by using the data acquisition command; and providing the acquired data to the application execution device in response to the accepted query.

11. A non-transitory computer readable medium storing a data acquisition program to make a computer execute:

storing acquisition definition information, where a value definition range that defines a range of a definition value is associated with an acquisition method to acquire data from a database, wherein the acquisition method for at least one respective definition value varies according to the defined range; and accepting, from an application execution device, a query command to acquire data from the database that stores data which is associated with a definition value, the query command including a value designation range that designates a range of a definition value corresponding to the data to be acquired, judging, by using the acquisition definition information and the query command, whether an overlapping range that overlaps with the value definition range exists in the value designation range, when the overlapping range is judged to exist, analyzing the query command to determine whether there are any candidate parts which need to be rewritten based on the stored acquisition definition information, rewriting, when there is a candidate part which needs to be rewritten, the query command based on the acquisition definition information,
generating, when the query command has been rewritten, based on the rewritten query command and the acquisition definition information, a data acquisition command to acquire data corresponding to a definition value which is included in the overlapping range, in an acquisition method corresponding to the value definition range,
outputting when there is no candidate part which needs to be rewritten, the query command as the data acquisition command;
acquiring data from the database by using the data acquisition command; and
providing the acquired data to the application execution device in response to the accepted query.

* * * * *